(12) United States Patent
Warren, Jr. et al.

(10) Patent No.: US 8,907,508 B2
(45) Date of Patent: Dec. 9, 2014

(54) LOAD PROTECTION SYSTEM FOR A TURBINE

(75) Inventors: John Dalton Warren, Jr., Waltham, MA (US); John Rogers Huey, Greenville, SC (US)

(73) Assignee: General Electric Company, Schenectady, NY (US)

(*) Notice: Subject to any disclaimer, the term of this patent is extended or adjusted under 35 U.S.C. 154(b) by 620 days.

(21) Appl. No.: 13/252,735

(22) Filed: Oct. 4, 2011

(65) Prior Publication Data

US 2013/0082468 A1   Apr. 4, 2013

(51) Int. Cl.
*H02P 9/04*   (2006.01)
*F02C 7/00*   (2006.01)

(52) U.S. Cl.
CPC ... *H02P 9/04* (2013.01); *F02C 7/00* (2013.01); *F05D 2220/76* (2013.01)
USPC ....................................... 290/40 R; 290/40 B

(58) Field of Classification Search
CPC .......... F02C 7/00; F05D 2220/76; H02P 9/04
See application file for complete search history.

(56) References Cited

U.S. PATENT DOCUMENTS

| 5,555,719 | A |   | 9/1996 | Rowen et al. | |
|---|---|---|---|---|---|
| 6,118,187 | A | * | 9/2000 | Hepner et al. | 290/40 B |
| 6,164,057 | A | * | 12/2000 | Rowen et al. | 60/39.27 |
| 7,274,111 | B2 |   | 9/2007 | Andrew et al. | |
| 2004/0245783 | A1 | * | 12/2004 | Gilbreth et al. | 290/52 |
| 2011/0016876 | A1 | * | 1/2011 | Cataldi et al. | 60/773 |
| 2011/0257801 | A1 | * | 10/2011 | Kumula et al. | 700/287 |
| 2012/0022712 | A1 | * | 1/2012 | Mosley et al. | 700/297 |

FOREIGN PATENT DOCUMENTS

| EP | 0425835 A3 | 5/1991 |
|---|---|---|
| WO | WO9521991 A1 | 8/1995 |

* cited by examiner

*Primary Examiner* — Tulsidas C Patel
*Assistant Examiner* — S. Mikailoff
(74) *Attorney, Agent, or Firm* — Cantor Colburn LLP

(57) ABSTRACT

A load protection system for a turbine is provided. The turbine has a load floor representing a lowest allowable load the turbine generally operates above. The turbine supplies power to an electrical grid. The grid has a grid frequency where as the grid frequency increases the turbine sheds load. The load protection system includes a controller in communication with the turbine and the electrical grid. The controller has a memory for storing a commanded target turbine load. The commanded target turbine load is the load the turbine operates at the load floor. The controller includes control logic for sending a flag to a variable rate limiter and a commanded load control block. The variable rate limiter and the commanded load control block generally prevent the turbine from shedding load and operating below the load floor once the flag is received.

19 Claims, 3 Drawing Sheets

LOAD PROTECTION SYSTEM FOR A TURBINE

BACKGROUND OF THE INVENTION

The subject matter disclosed herein relates to a load protection system for a turbine, and more specifically to a load protection system for controlling a turbine that allows a load floor that supports a minimum load.

Gas turbines are commonly used in load charging environments such as power generation services. The gas turbine is employed to supply power to an electrical power grid and is used to maintain a specified grid frequency range during operation. Specifically, the output of the gas turbine is adjusted in an effort to counteract grid frequency disturbances. Thus, if the specified grid frequency range is exceeded, then the gas turbine sheds load. That is, the gas turbine is under-fired and produces less power than what is typically needed by the power grid in the event the power grid exceeds the specified grid frequency range.

There are various factors governing the control of gas turbines such as, for example, emissions compliance and service life. Under-firing of the gas turbine may lead to increased emissions. In an effort to comply with emissions requirements, the gas turbine is typically kept above a minimum firing temperature (or minimum technical load if allowed). There is a balance between maintaining the specified grid frequency range while at the same time complying with emissions requirements.

BRIEF DESCRIPTION OF THE INVENTION

According to one aspect of the invention, a load protection system for a turbine is provided. The turbine has a load floor representing a lowest allowable load the turbine generally operates above. The turbine supplies power to an electrical grid. The grid has a grid frequency where as the grid frequency increases the turbine sheds load. The load protection system includes a controller in communication with the turbine and the electrical grid. The controller has a memory for storing a commanded target turbine load. The commanded target turbine loading is the load the turbine operates at the load floor due to a grid frequency increase. The controller includes a control variable for defining a nominal grid frequency of the electrical grid. The controller includes a control variable for monitoring the turbine for a commanded turbine load, the commanded turbine load being the load of the turbine prior to a change in the grid frequency. The controller includes a control variable for calculating a grid frequency limit. The grid frequency limit represents the grid frequency as the turbine operates at the load floor. The grid frequency limit is based on the nominal grid frequency, the commanded turbine load, and the commanded target turbine loading. The controller includes a control variable for comparing the grid frequency limit with a filtered grid frequency and determining if the filtered grid frequency is at least about equal to the grid frequency limit. The controller includes control logic for setting a flag in the event that the filtered grid frequency is about equal to or exceeds the grid frequency limit. The controller includes control logic for sending the flag to a variable rate limiter and a commanded load control block. The variable rate limiter and the commanded load control block generally prevent the turbine from shedding load and operating below the load floor once the flag is received.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
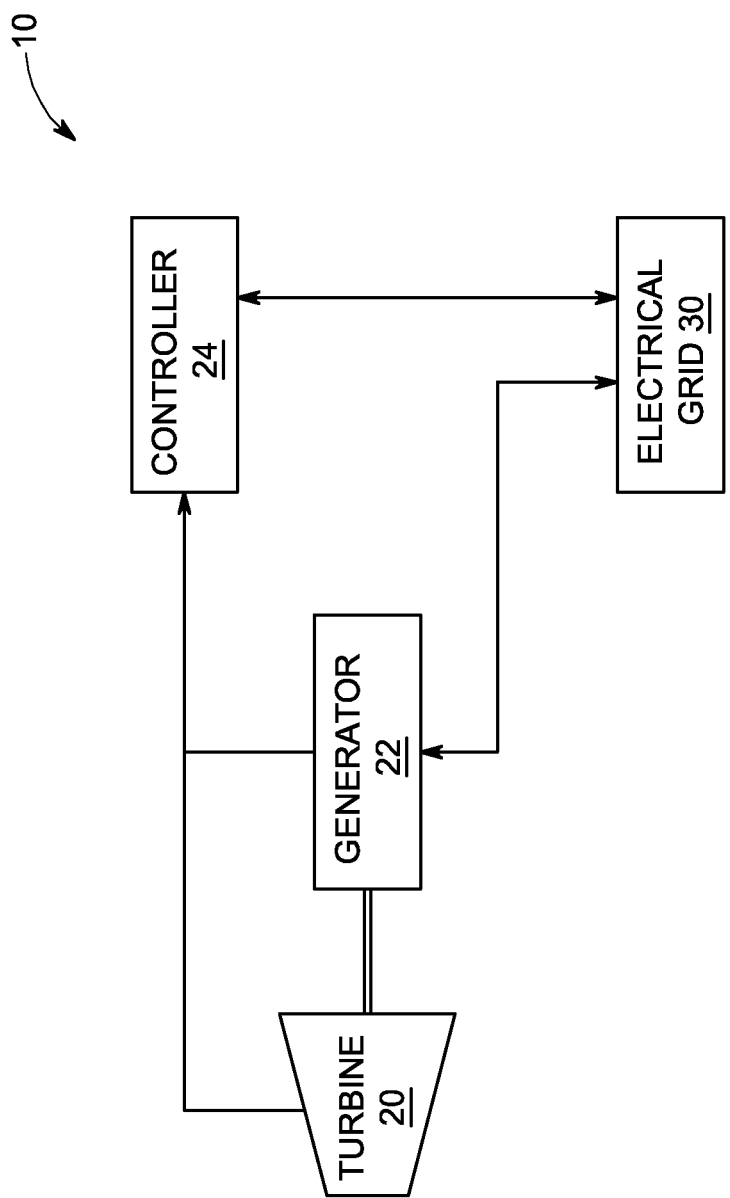
FIG. 1 is a schematic illustration of a load protection system for a turbine including a turbine, a generator, a controller, and an electrical grid.

FIG. 1 is a schematic illustration of an exemplary load protection system indicated by reference number 10. The load protection system 10 includes a turbine 20, a generator 22, a controller 24, and an electrical grid 30. The turbine 20 is coupled to the generator 22 for the generation of electrical power that is supplied to the electrical grid 30. The electrical grid 30 operates at a utility or grid frequency. The grid frequency represents the frequency that alternating current (AC) is transmitted by the electrical grid 30. The grid frequency of the electrical grid 30 is dependent on a rotational speed of the generator 22. In one exemplary embodiment, the turbine 20 is a gas turbine. The turbine 20 is adjusted during operation of the electrical grid 30 by the controller 24 in an effort to maintain the grid frequency at a specific operating frequency. Specifically, in the event the nominal grid frequency increases above a specified upper limit the turbine 20 sheds load by decreasing fuel flow, and as the grid frequency decreases below a specified lower limit the turbine 20 increases load by increasing fuel flow.

The grid frequency of the electrical grid 30 varies depending on the location of the load protection system 10. For example, in some areas of the world the nominal grid frequency is typically maintained at about 50 Hz, however in the United States the nominal grid frequency is typically about 60 Hz. However, it is to be understood that the grid frequency may be set to other values as well. A nominal frequency is typically about 50 Hz or about 60 Hz (depending on the area of the world).

The turbine 20 has a minimum load floor that represents the lowest allowable load that the turbine 20 typically operates on a given day. Specifically, in one embodiment, the load floor represents lowest load that the turbine 20 may operate at without exceeding emissions requirements. In one embodiment, the load floor is measured in megawatts (MW). The controller 24 is in communication with the turbine 20, the generator 22, and the electrical grid 30. In one exemplary embodiment, the controller 24 is a turbine controller that is employed for controlling various functions of the turbine 20 such as fuel and emissions control, as well as other functions of a gas turbine.

The controller 24 includes control logic for monitoring the turbine 20, the generator 22, and the electrical grid 30. Specifically, the controller 24 includes a control variable for defining the electrical grid 30 at a nominal grid frequency. The fuel control module also includes control logic for monitoring the turbine 20 for a real-time or actual turbine load. The controller 24 includes a memory as well, where the controller stores a commanded target turbine minimum load. The commanded target turbine minimum load represents the load that the turbine 20 operates at when at the load floor as the result of high frequency. The controller 24 includes control logic for monitoring the turbine 20 for a commanded turbine load that represents the turbine load that the turbine 20 is operating at prior to a change in the grid frequency of the electrical grid 30.

Figure 2:
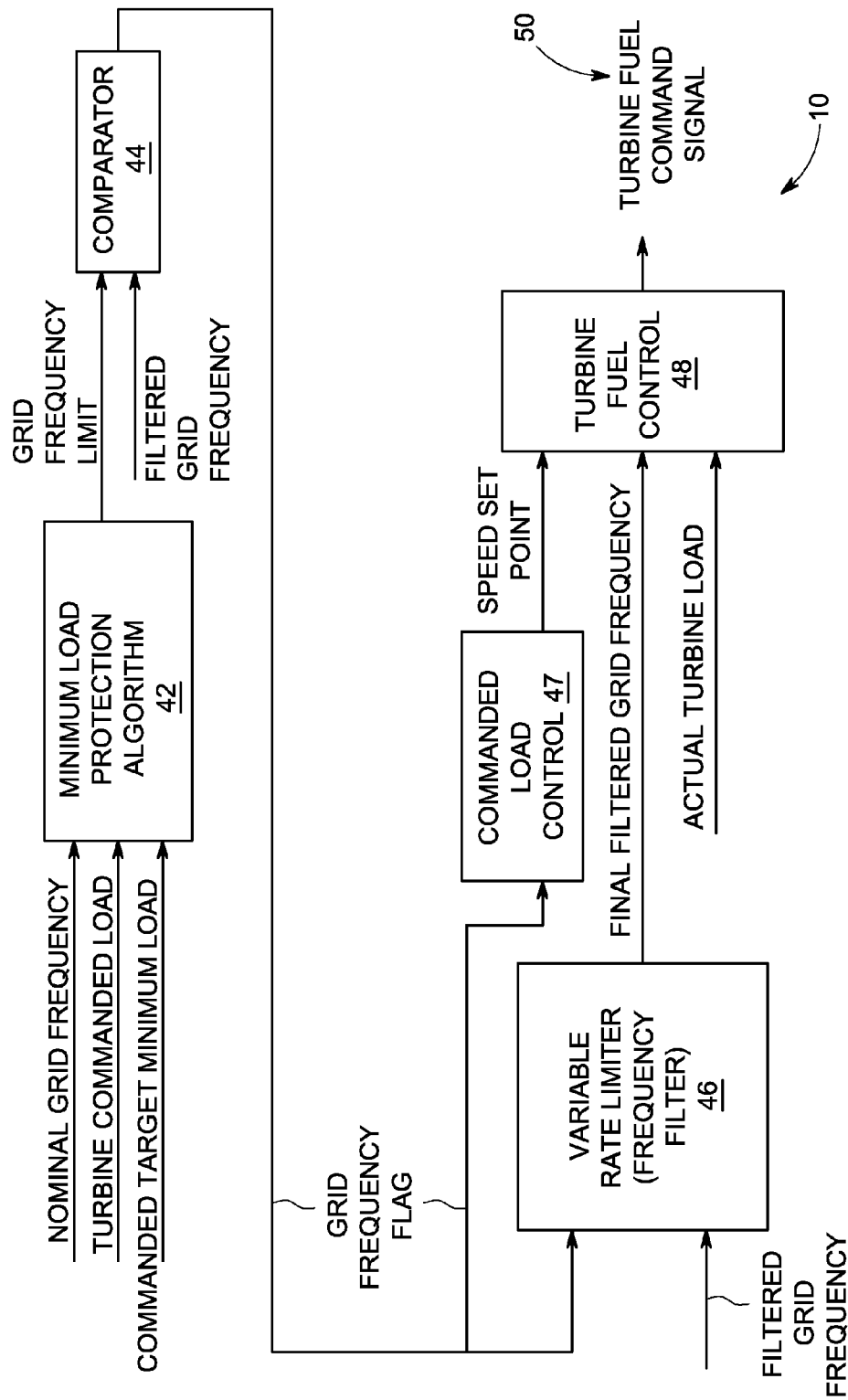
FIG. 2 is a block diagram of a load protection system scheme that is executed by the controller.

Turning now to FIG. 2, a block diagram 40 of the load protection system 10 executed by the controller 24 is illustrated. The block diagram 40 illustrates a minimum load protection algorithm block 42, a comparator 44, a frequency filter or variable rate limiter 46, a commanded load control 47, and a turbine fuel controller 48. The minimum load protection algorithm block 42 receives values for the nominal grid frequency of the electrical grid 30, the turbine commanded load of the turbine 20, and the commanded target minimum turbine loading. The minimum load protection algorithm block 42 determines a grid frequency limit based on the nominal grid frequency, the turbine commanded load, and the commanded target minimum turbine load.

The grid frequency limit is a calculated value that represents the grid frequency of the electrical grid 30 that corresponds to a load shed that reduces the turbine load from the turbine commanded load to the commanded target turbine minimum load. The minimum load protection algorithm block 42 sends the grid frequency limit to the comparator 44.

The comparator 44 compares the grid frequency limit with a filtered grid frequency and determines if the filtered grid frequency is about equal to or exceeds the grid frequency limit. In the event that the filtered grid frequency is equal to or exceeds the grid frequency limit, the comparator 44 sets a flag. The controller 24 includes control logic for presenting the flag to the variable rate limiter 46 and to the commanded load control 47. The variable rate limiter 46 acts as a frequency filter. The variable rate limiter 46 sends a final filtered grid frequency value to the turbine fuel control block 48. Specifically, the variable rate limiter 46 is configured to typically send the filtered grid frequency to the turbine fuel control block 48 until the flag is presented to the variable rate limiter 46.

Once the flag is presented to the variable rate limiter 46, the variable rate limiter 46 then sends the grid frequency limit to the turbine fuel control block 48. Thus, in the event the actual grid frequency rises above the grid frequency limit, the turbine fuel control block 48 sheds load according to the grid frequency limit. This ensures that the turbine load stays at or above the commanded target turbine minimum load.

The commanded load control 47 also receives the flag. A turbine speed setpoint is calculated by the commanded load control 47. The turbine speed setpoint is compared to the actual speed of the turbine 20. The error between the turbine speed setpoint and the actual speed of the turbine 20 is typically used to determine how much fuel is delivered to the turbine 20. For example, in one illustrative example, if an error of about zero exists between the turbine speed setpoint and the actual speed of the turbine 20, the zero error condition corresponds to a steady-state fuel condition. The controller 24 includes control variable for calculating a turbine fuel command signal 50 that is based on the actual turbine load, a final filtered grid frequency from the variable rate limiter 46, and the turbine speed setpoint from the commanded load control 47. The controller 24 includes control logic for sending the turbine fuel command signal 50 to the turbine 20 (the turbine 20 is shown in FIG. 1).

The turbine fuel command signal 50 is configured for halting further unloading of the turbine 20 in the event the flag is set by the comparator 44. Specifically, the turbine fuel command signal 50 generally prevents the turbine 20 from shedding load and operating below the commanded load target. This is because once the flag is sent to the variable rate limiter 46, the value of the filtered grid frequency is the grid frequency limit. Thus, the filtered grid frequency does not exceed the grid frequency limit. Limiting the value of the grid frequency will in turn substantially halt further load shedding of the turbine 20. Therefore, the variable rate limiter 46 generally prevents the filtered grid frequency from increasing once the flag is received.

Figure 3:
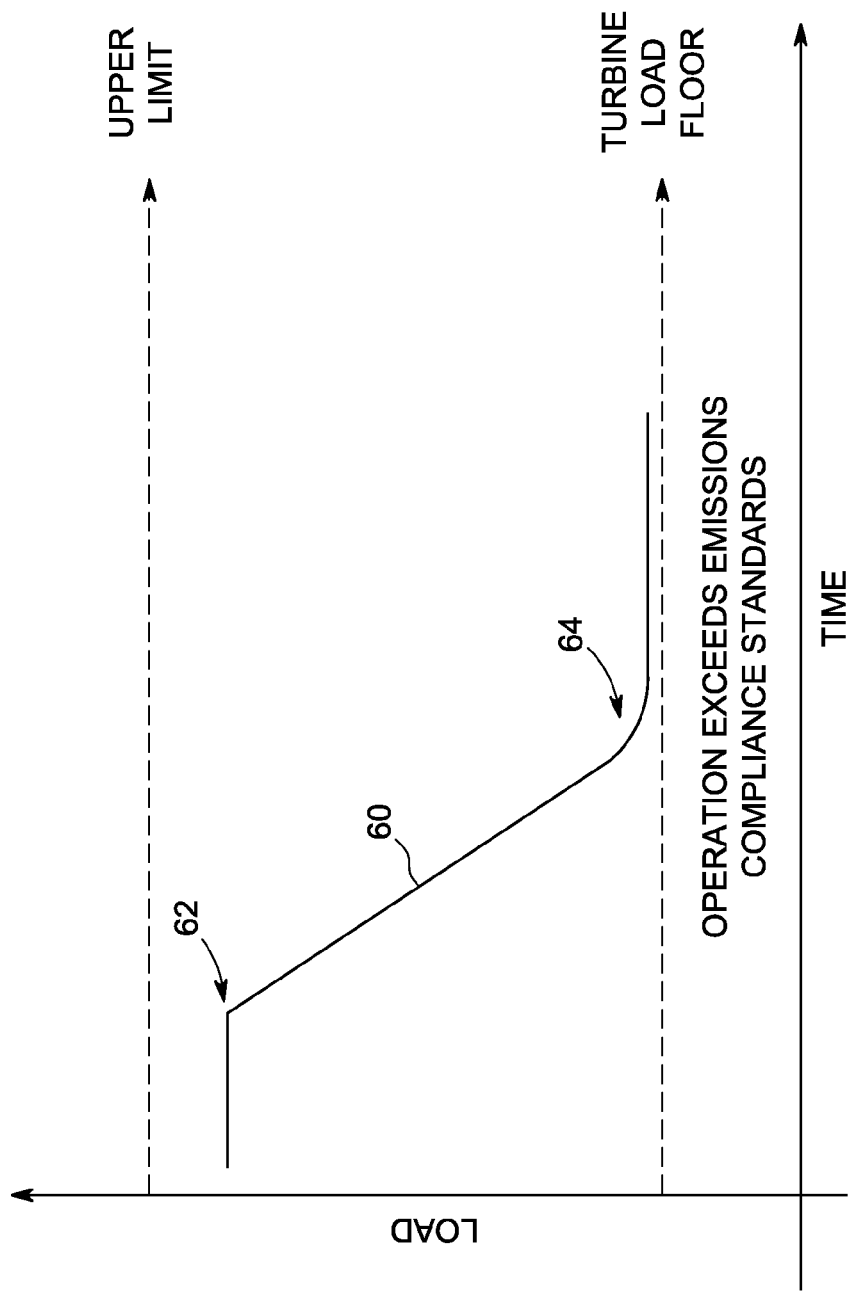
FIG. 3 is a graph illustrating operation of the turbine shown in FIG. 1 with the load protection system.

FIG. 3 is a graph illustrating operation of the turbine 20 (shown in FIG. 1) employing the load protection system 10, where a turbine load line 60 represents the turbine load. Portion 62 of the turbine load line 60 represents a point in turbine operation where the grid frequency approaches the grid frequency limit. As the electrical grid 30 increases in grid frequency and meets or exceeds the grid frequency limit, the turbine 20 sheds load accordingly. Portion 64 of the turbine load line 60 illustrates operation of the turbine 20 as the turbine 20 approaches the turbine load floor. Referring to both FIGS. 2-3, once the grid frequency is about equal to the grid frequency limit, the comparator 44 of the controller 24 sets the flag. Once the flag is presented to the variable rate limiter 46, the variable rate limiter 46 then sends the grid frequency limit to the turbine fuel control block 48. The turbine fuel control block 48 sends the turbine fuel command signal 50 to the turbine 20. The turbine fuel command signal 50 halts further unloading of the turbine 20. Therefore, as shown in FIG. 3, the turbine 20 does not generally operate below the turbine load floor.

In the exemplary embodiment as shown in FIG. 3, the load floor represents the lowest load that the turbine 20 may operate at without exceeding emissions requirements. However, it is to be understood that the load floor may represent other limits as well. For example, in one embodiment, the load floor may represent driving the load floor below zero megawatts. In yet another embodiment, the load floor may represent a load of the turbine 20 needed by a steam turbine for operation.

Referring specifically to FIGS. 1-2, the load protection system 10 is configured for halting further unloading of the turbine 20 in the event the flag is set by the comparator 44. Specifically, the turbine 20 is generally unable to shed load and operate below the load limit once the flag is received. Thus, because the turbine 20 is generally unable to further shed load once the flag is set, the load protection system 10 ensures that emissions requirements or other types of limits (e.g. limits for steam turbine operation as described above) are met.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A load protection system for a turbine, the turbine having a load floor representing a lowest allowable load the turbine generally operates above, the turbine coupled to an electrical generator for a generation of electrical power to supply to an electrical grid, the electrical grid having a grid frequency where as the grid frequency increases the turbine sheds load, the load protection system comprising:
the generator having a rotational speed, and wherein the grid frequency is dependent on the rotational speed of the generator;
a controller in communication with the turbine and the electrical grid, the controller having a memory for storing a commanded target turbine load, the commanded target turbine load being the load the turbine operates at the load floor, the controller being configured to:
define a nominal grid frequency for the electrical grid using a control variable;
monitor the turbine for a commanded turbine load, the commanded turbine load being a load of the turbine prior to a change in the grid frequency;
calculate a grid frequency limit, the grid frequency limit representing the grid frequency as the turbine operates at the load floor, the grid frequency limit based on the nominal grid frequency, the commanded turbine load, and the commanded target turbine load;
compare the grid frequency limit with a filtered grid frequency and determine if the filtered grid frequency is at least about equal to the grid frequency limit;
set a flag in the event that the filtered grid frequency is equal to or exceeds the grid frequency limit; and
send the flag to a variable rate limiter and a commanded load control block, the variable rate limiter and the commanded load control block generally preventing the turbine from shedding load and operating below the load floor once the flag is received.

2. The load protection system of claim 1, wherein the variable rate limiter of the controller sends a final filtered grid frequency value to a turbine fuel control block, wherein the final filtered grid frequency value does not exceed the grid frequency limit.

3. The load protection system of claim 2, wherein the commanded load control block is configured to calculate a turbine speed setpoint, wherein the turbine speed setpoint is compared to an actual speed of the turbine, and an error between the turbine speed setpoint and the actual speed of the turbine is used to determine an amount of fuel delivered to the turbine.

4. The load protection system of claim 3, wherein the turbine fuel control block is configured to calculate a turbine fuel command signal based on an actual turbine load, the filtered grid frequency, and the turbine speed setpoint.

5. The load protection system of claim 4, wherein the controller is further configured to send the turbine fuel command signal to the turbine, wherein the turbine fuel command signal halts unloading of the turbine once the flag is set.

6. The load protection system of claim 1, wherein the load floor of the turbine is based on emissions compliance standards of the turbine.

7. The load protection system of claim 1, wherein the nominal grid frequency is one of about 50 Hz and about 60 Hz.

8. The load protection system of claim 1, wherein the turbine is a gas turbine.

9. The load protection system of claim 1, wherein the filtered grid frequency represents an actual grid frequency of the electrical grid.

10. A load protection system for a turbine, the turbine having a minimum load floor representing a lowest allowable load the turbine generally operates above, the turbine supplying power to an electrical grid, the electrical grid having a grid frequency where as the grid frequency increases the turbine sheds load, comprising:
a generator having a rotational speed, and wherein the grid frequency is dependent on the rotational speed of the generator;
a controller in communication with the turbine, the generator, and the electrical grid, the controller having a memory for storing a commanded target turbine load, the commanded target turbine load being the minimum load the turbine operates at, the controller being configured to:
define a nominal grid frequency for the electrical grid using a control variable;
monitor the turbine for a commanded turbine load, the commanded turbine load being the load of the turbine prior to a change in the grid frequency;
calculate a grid frequency limit, the grid frequency limit representing the grid frequency as the turbine operates at the minimum load floor, the grid frequency limit based on the nominal grid frequency, the commanded turbine load, and the commanded target turbine load;
compare the grid frequency limit with a filtered grid frequency and determine if the filtered grid frequency is at least about equal to the grid frequency limit;
set a flag in the event that the filtered grid frequency is greater than or equal to the grid frequency limit;
send the flag to a variable rate limiter and a commanded load control block, the variable rate limiter and the commanded load control block generally preventing the turbine from shedding load and operating below the minimum load floor once the flag is received; and
send a final filtered grid frequency value from the variable rate limiter to a turbine fuel control block, wherein the final filtered grid frequency value does not exceed the grid frequency limit.

11. The load protection system of claim 10, wherein the commanded load control block is configured to calculate a turbine speed setpoint, wherein the turbine speed setpoint is compared to an actual speed of the turbine, and an error between the turbine speed setpoint and the actual speed of the turbine is used to determine an amount of fuel delivered to the turbine.

12. The load protection system of claim 11, wherein the turbine fuel control block is configured to calculate a turbine fuel command signal based on an actual turbine load, the final filtered grid frequency, and the turbine speed setpoint.

13. The load protection system of claim 12, wherein the controller is further configured to send the turbine fuel command signal to the turbine, wherein the turbine fuel command signal halts unloading of the turbine once the flag is set.

14. The load protection system of claim 10, wherein the minimum load floor of the turbine is based on emissions compliance standards of the turbine.

15. The load protection system of claim 10, wherein the nominal grid frequency is one of about 50 Hz and about 60 Hz.

16. The load protection system of claim 10, wherein the turbine is a gas turbine.

17. A load protection system, comprising:
a gas turbine having an actual speed and a minimum load floor representing a lowest allowable load the gas turbine generally operates above, the gas turbine supplying power to an electrical grid, the electrical grid having a grid frequency where as the grid frequency increases the gas turbine sheds load;
a generator having a rotational speed, and wherein the grid frequency is dependent on the rotational speed of the generator;
a controller in communication with the gas turbine, the generator, and the electrical grid, the controller having a memory for storing a commanded target turbine load, the commanded target turbine load being the minimum load the gas turbine operates at, and the controller including a commanded load control block for calculating a turbine speed setpoint that is compared to the actual speed of the gas turbine, and an error between the turbine speed setpoint and the actual speed of the gas turbine is used to determine an amount of fuel delivered to the gas turbine, the controller being configured to:
define a nominal grid frequency for the electrical grid using a control variable;
monitor the gas turbine for a commanded turbine load, the commanded turbine load being a load of the turbine prior to a change in the grid frequency;
calculate a grid frequency limit, the grid frequency limit representing the grid frequency as the gas turbine operates at the minimum load floor, the grid frequency limit based on the nominal grid frequency, the commanded turbine load, and the commanded target turbine load;
compare the grid frequency limit with a filtered grid frequency and determine if the filtered grid frequency is at least about equal to the grid frequency limit;
set a flag in the event that the filtered grid frequency is greater than or equal to the grid frequency limit;
send the flag to a variable rate limiter and the commanded load control block, the variable rate limiter and the commanded load control block generally preventing the gas turbine from shedding load and operating below the minimum load floor once the flag is received; and
send a final filtered grid frequency value from the variable rate limiter to a turbine fuel control block, wherein the filtered grid frequency does not exceed the grid frequency limit; and
calculate a turbine fuel command signal at the turbine fuel control block, the turbine fuel command signal based on an actual turbine load, the filtered grid frequency, and the turbine speed setpoint.

18. The load protection system of claim 17, wherein the controller is further configured to send the turbine fuel command signal to the gas turbine, wherein the turbine fuel command signal halts unloading of the gas turbine once the flag is set.

19. The load protection system of claim 17, wherein the minimum load floor of the gas turbine is based on emissions compliance standards of the gas turbine.

* * * * *